United States Patent [19]

de Witte

[11] Patent Number: 4,592,065
[45] Date of Patent: May 27, 1986

[54] GAS LASER EXCITED BY A TRANSVERSE ELECTRICAL DISCHARGE TRIGGERED BY PHOTOIONIZATION

[75] Inventor: Olivier de Witte, Gif sur Yvette, France

[73] Assignee: Compagnie Industrielle des Lasers Cilas Alcatel, Marcoussis, France

[21] Appl. No.: 507,634

[22] Filed: Jun. 27, 1983

[30] Foreign Application Priority Data

Jun. 25, 1982 [FR] France .................. 82 11172

[51] Int. Cl.⁴ .................................. H01S 3/097
[52] U.S. Cl. ............................ 372/83; 372/70; 372/86; 372/87
[58] Field of Search ............. 372/73, 74, 83, 86, 372/87, 70

[56] References Cited

U.S. PATENT DOCUMENTS

| | | | |
|---|---|---|---|
| 4,119,855 | 10/1978 | Bernacki | 250/402 |
| 4,230,994 | 10/1980 | Bradley | 372/74 |
| 4,240,044 | 12/1980 | Fahlen et al. | 372/87 |

OTHER PUBLICATIONS

Review of Scientific Instruments, col. 52, No. 11, Nov. 1981, New York, (US), J. I. Levatter et al., "Low Energy X-ray Preionization Source for Discharge Excited Lasers", pp. 1651-1654, p. 1651, lines 18-26, p. 1652, Fig. 2.

Applied Physics Letters, vol. 34, No. 8, Apr. 1979, New York, (US), Shao-Chi Lin et al., "X-ray Preionization for Electric Discharge Lasers", pp. 505-508, Fig. 2.

Primary Examiner—James W. Davie
Attorney, Agent, or Firm—Sughrue, Mion, Zinn, Macpeak, and Seas

[57] ABSTRACT

An X-ray generator 7 directly connected to the electrode 8 internally of a hollow cathode 3 emits electrons under a field effect to generate X-rays, the generator 7 supplying 50 to 100 Kv with a rise time of less than 10 nanoseconds. X-rays rapidly created, in turn, rapidly create electrons in the active medium 1 between anode 2 and cathode 3 to trigger a discharge therebetween, across which anode and cathode the voltage of a laser capacitor is pre-applied at a level below the breakdown voltage of the active medium.

5 Claims, 8 Drawing Figures

GAS LASER EXCITED BY A TRANSVERSE ELECTRICAL DISCHARGE TRIGGERED BY PHOTOIONIZATION

The invention relates to a gas laser excited by a transverse electric discharge triggered by photoionization.

BACKGROUND OF THE INVENTION

Many lasers use, in known manner, a gaseous active medium at pressures of between 0.1 and 10 atmospheres and capable of emitting over an entire range of wavelengths lying between an ultraviolet 200 nm and an infrared 10,000 nm when excited by a transverse electric discharge.

One such laser includes two linear electrodes: an anode and a cathode; which extend parallel to each other and to the emission axis of the laser. A transverse discharge, perpendicular to the emission axis of the laser, is generally triggered by a high-speed switch, eg. a spark gap or a hydrogen thyratron, enabling energy stored in capacitive components to flow into the discharge. Such capacitive components are referred to hereinafter by the phrase laser capacitor. They are high-speed, ie. they are constructed, as are their connections, in such a manner as to be able to discharge rapidly. More particularly, in a first known, high energy (more than 0.1 J of light), transverse discharge laser, the discharge is obtained by a sudden application of the laser capacitor voltage via a power switch such as a spark gap.

With this first known laser many problems are encountered when it is desired to obtain reliable industrial type operation. The high speed switch suffers from three major drawbacks. Firstly it is unreliable due to rapid wear of its switching electrodes while passing very high peak currents (about $10^4$ to $10^6$ amps). Secondly, such a switch itself consumes a large fraction (30% to 50%) of the stored energy, thereby reducing the energy efficiency of the laser. Finally, the switch possesses self-inductance which has the effect of mismatching the impedance of the discharge between the laser electrodes and the impedance of the assembly constituted by the laser capacitor and its connection components, thereby slowing down the discharge and further reducing laser efficiency.

For large volume lasers, a pre-ionizing device is often added to pre-ionize the active gas volume, thereby enabling a more uniform discharge to be obtained. In said first known laser, a pulse of X-rays generated inside the laser cathode is used to ionize the active medium prior to laser triggering, thereby ensuring that the laser discharge which follows is more uniform and more rapid. This first known laser is described in an article by S. C. Lin and J. I. Levatter which appeared in the journal Applied Physics Letters, Vol 34, p. 505 (1979).

Elsewhere, tests have recently been performed on a small laser to obtain satisfactory laser operation without a switch. More particularly, a gas laser is known which is excited by a transverse electric discharge which is triggered by a pulse of ultraviolet radiation passing through a semi-transparent wall of the cathode laser to ionize the active medium.

This second known laser has the following drawbacks:

in some active media, the discharge between the electrodes appears to be insufficiently uniform, although in other cases it is sufficiently uniform;

further, when the cross sectional area of the space occupied by the active medium is large, eg. 3 cm×3 cm, the ultraviolet radiation coming from the cathode is too attenuated when it reaches the vicinity of the anode, which makes it difficult to obtain a uniform discharge. However, it is necessary to obtain an exciting electrical discharge which is uniform in order to obtain good energy efficiency in the laser;

also, the semi-transparent cathode, which is subjected to ion bombardment during each excitation discharge deteriorates rapidly, thereby limiting the life of the laser, or the total energy which can be extracted therefrom.

Preferred embodiments of the present invention increase the energy efficiency of a gas laser excited by a transverse electric discharge which is itself triggered by photoionization, while at the same time making the excitation discharge more uniform and without using a power switch. Said preferred embodiments provide a laser with an increased operating rate and lifetime, eg. a laser which is capable of more than $10^8$ shots at a nominal rate of 1000 Hz and with an energy of about 1 J per shot.

SUMMARY OF THE INVENTION

The present invention provides a gas laser excited by a transverse electric discharge itself triggered by photoionization, said laser comprising:

two linear laser electrodes, namely a laser cathode and a laser anode, extending parallel in a longitudinal direction and facing each other, the space between said electrodes being occupied by an active gaseous medium suitable for amplifying laser radiation when excited by an electric discharge;

a laser capacitor having very low impedance enabling rapid discharge into the active medium to excite said medium, and having its two terminals directly connected to the two laser electrodes;

a high energy laser charging circuit for charging said laser capacitor to an operating voltage which is less than the self-discharge voltage which would on its own cause arcs to strike across between the laser electrodes, said charge creating an operating electric field in the active medium;

and a generator of ionizing radiation for directing a pulse of trigger radiation into the active medium, after the active medium has been subjected to the operating field, said pulse being sufficiently large to trigger a uniform transverse discharge between the laser electrodes to make the medium a laser radiation amplifying medium;

wherein said generator of radiation is a high-speed generator supplying said trigger pulse in less than 10 nanoseconds.

An important principle of the invention thus consists in making enough electrons appear in the laser gas mixture in a short enough period of time to trigger a discharge between the laser electrodes which is uniform. When the electrons appear, the electrodes are directly connected to the terminals of the supply capacitor which is already charged to a voltage below the self-discharge voltage.

The term "enough electrons" is used to designate a number such that the avalanches of electrons created from each initial electron during the discharge all overlap one another and thereby give the discharge a uniform aspect. Plasma specialists have both theoretical and practical knowledge of the numbers of electrons per unit volume below which a pre-ionized discharge is no longer uniform. Thus, in an article by Levatter and Lin (Journal of Applied Physics, 51, p 210, January 80) the authors found a minimum figure of $10^6$ electrons per cubic centimeter for a KrF laser emitting at 250 nm and having an active gaseous mixture constituted by He (100), Xe (8), $F_2$ at a pressure of one atmosphere, with the proportions being by volume.

The term "short enough" means a period of time about equal to the time it takes for an electron avalanche to form in a discharge, or a shorter time. The time taken to form an electron avalanche is about 10 to 20 times the characteristic time of exponential electron multiplication.

Here also, plasma specialists know the characteristic times of electron multiplication in various media suitable for use as active media in lasers. The characteristic times depend both on the nature of the gaseous mixture, and in particular on whether any electrophilic gas is present, and on the value of electric field applied by the electrodes, where the significant magnitude is the ratio of field to gas pressure (field per unit pressure). Thus, in a Ph.D. thesis given at the University of Southern California at San Diego in 1978, H. Luo gives the figure of 0.3 nanoseconds as the characteristic time for electron multiplication in the KrF laser described above, for an electric field of $4.10^{-20}$ volts per square meter and per molecule. Likewise, using nitrogen for example, the characteristic time is 0.2 ns for an electric field per unit pressure of $10^4$ volts per hundredth of an atmosphere (A.ALI Applied Optics—6—2115. 1967).

Given the announced performances of known photo-ionization triggered lasers, it should be observed that it appears to the inventor that the triggering pulse of ionizing radiation has always been more than ten times longer, eg. 40 to 100 times longer, than the characteristic time of electron mulitplication in the active medium, ie. about 30 nanoseconds in practice.

By way of example, and to fix an idea of scale, it may be considered that in accordance with the present invention, more than $10^6$ electrons need to be made to appear per cubic centimeter of active medium in a period of less than 10 nanoseconds, and preferably in less than 3 nanoseconds. A preferred means of making the electrons appear in the required time consists in using a high-speed generator of X-rays. It is thus preferable for said generator of ionizing radiation to be formed in the laser cathode and to comprise:

an evacuated chamber inside the cathode;

a wall delimiting said chamber on the anode side thereof and comprising a metal support plate which is transparent to X-rays and which is mechanically strong enough to withstand the pressure of the active medium, and the inside face of said wall bearing a thin sheet of X-ray generating metal;

an emissive electrode disposed inside the chamber opposite to the X-ray generating sheet and suitable for emitting a flux of electrons under the acceleration of an electric field;

and a short rise time voltage generator suitable for applying a high tension pulse to the emissive electrode, which pulse is negative relative to the active wall, whereby said generator sheet is bombarded by energetic electrons and X-rays are emitted by said sheet into the active medium through the support plate.

BRIEF DESCRIPTION OF THE DRAWINGS

There follows a non-limiting description given with reference to the accompanying schematic figures, of how the invention may be performed. When a member is shown in several figures, it is designated by the same reference symbol therein.

MORE DETAILED DESCRIPTION

Figure 1:
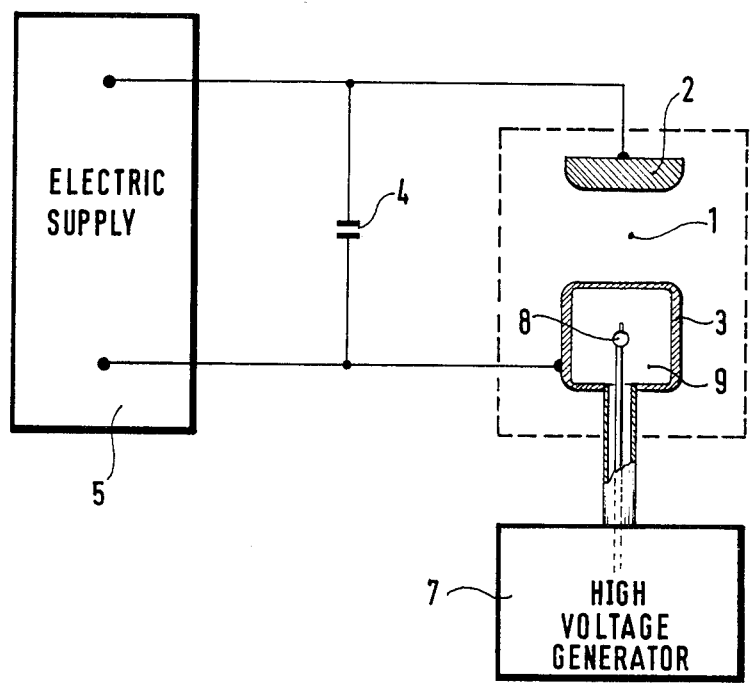
FIG. 1 is an electrical circuit diagram showing the operation of a laser in accordance with the invention.

In FIG. 1, an active gaseous medium for a laser 1 is contained between two linear laser electrodes, namely an anode 2 and a cathode 3 which are parallel to each other and perpendicular to the plane of the figure. The source of energy for the discharge between the anode 2 and the cathode 3 is constituted by a capacitor component 4 having its terminals directly connected to the laser anode and cathode to reduce the inductance of the connection as much as possible. This component is referred to hereinafter as the laser capacitor and may be constituted either by a single capacitor or by a very low impedance energy storage line such as a known type of water line, for example. It is charged to the maximum operating voltage of the laser by means of a power supply unit 5. The power may be supplied as DC or as pulses, depending on the type of capacitor 4. For a water line, it is advantageous to charge the capacitor in slightly less than 10 microseconds which is a guide value for which the dielectric strength of water holds up satisfactorily at 100 kV/cm and for which the high tension power supply unit is not too difficult to implement. This nominal operating voltage is less than the self-striking voltage which is of itself sufficient to cause arcs to strike between the laser electrodes. The operating voltage lies between 20% and 97% of the self-striking voltage depending on the gas mixture in use. A preferred implementation of the power supply consists in using a voltage raising transformer having a low voltage capacitor discharged through its primary by a highly reliable silicon thyristor.

Inside the cathode 3, there is an electrode 8 which emits electrons under the field effect to generate the X-rays. The electrode is connected to a high speed high tension generator 7 capable of supplying 50 to 100 kV with a rise time of less than 10 nanoseconds in general, said voltage being applied between the electrode 8 and the cathode 3, and is described in greater detail below.

Figure 2:
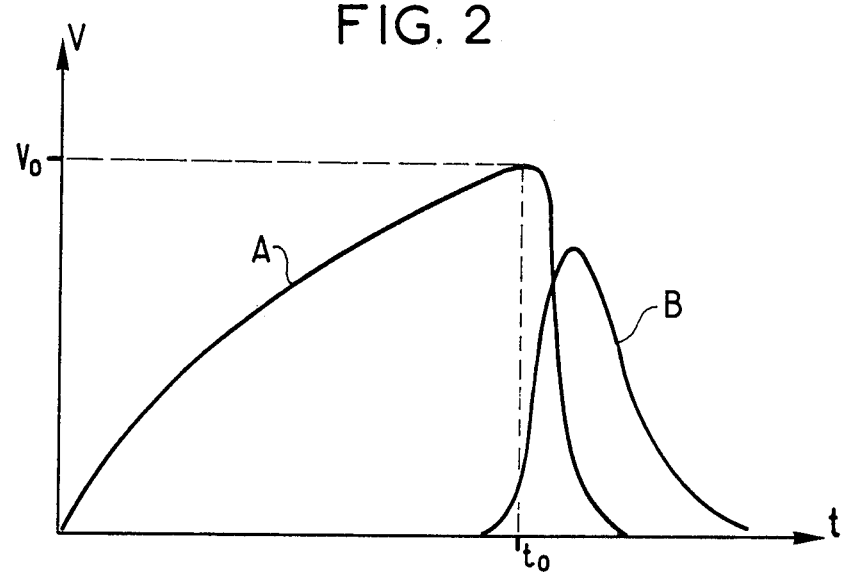
FIG. 2 shows graphs of the laser's operation, with time being plotted along the X-axis.

FIG. 2 shows operation of the laser as a function of time by means of curves A and B which are provided by a commercial high speed oscilloscope connected to the laser electrodes via attenuator probes.

The origin on the time axis is the instant that the capacitor 4 begins to charge from the power supply unit 5. Curve A shows how the charge varies with time, increasing until the nominal voltage $V_0$ is reached at time $t_0$. At this instant, the high tension generator 7 sends a pulse to the electrode 8 situated inside the cathode 3, and the rapid rise time of this pulse is shown as curve B in FIG. 2. The electrons thus liberated from the electrode 8 bombard the wall of the cathode 3. X-rays are thus simultaneously and rapidly created, and they in turn create electrons in the active medium 1 at sufficient density (more than $10^6/cm^3$) to trigger a discharge between the anode 2 and the cathode 3.

Figure 3:
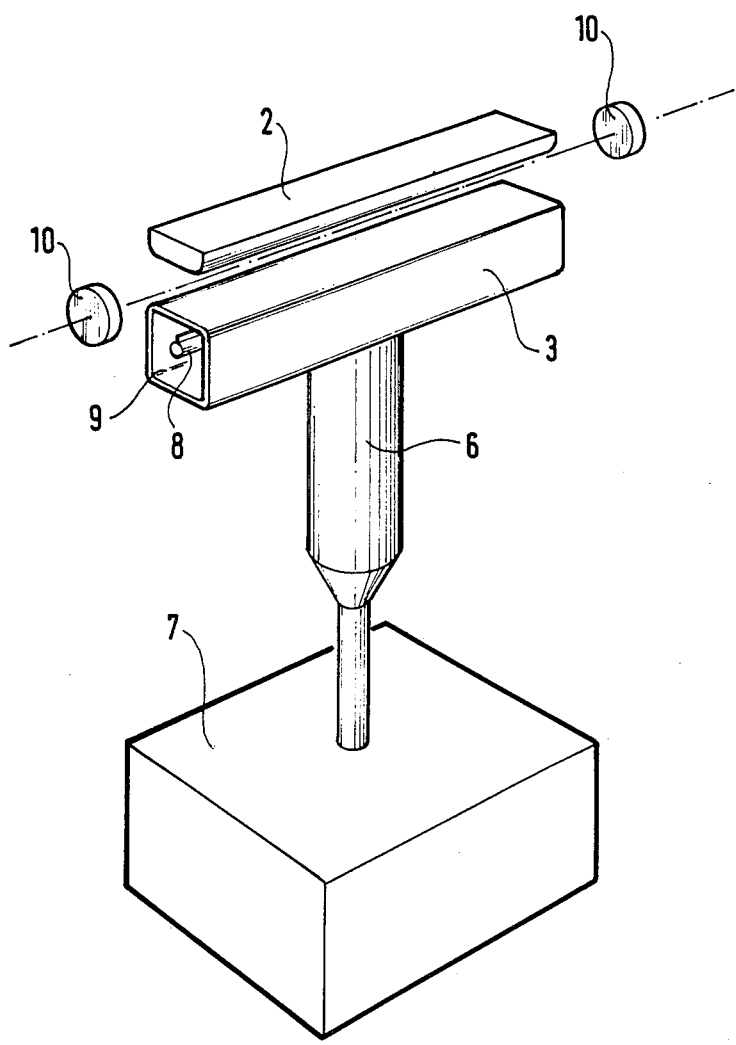
FIG. 3 is a perspective view of component parts of the same laser.

FIG. 3 is a perspective view restricted to the essential components of the laser and of the device for photoionization triggering. The anode 2 and the cathode 3 which are situated in parallel and facing each other, are generally connected along their entire length by two plates to respective terminals of the laser capacitor. The active baseous medium is situated between the electrodes and between two windows 10 which close a gas chamber. This provides, in conventional manner, either laser oscillation (in which case one of the windows is a total reflector while the other is a partial reflector thereby forming an optical cavity), or else an amplifier for a laser beam of the same wavelength created by some other oscillator. The active gas may be either at rest for strike by strike operation, or else it may be flowing rapidly and transvesally (ie. perpendicularly to the laser axis and to the discharge between the anode and the cathode) in a forced circulation chamber provided for the purpose, in order to operate at a high repetition rate (1 kHz). Depending on the wavelengths to be generatead, the active gas may be composed as indicated below, where parts by volume are inidicated in parentheses:

| Laser | Wavelength | Gas mixture | Pressure in Bars | |
|---|---|---|---|---|
| KrF | 268.4 nm | He, Kr, $F_2$ | (100, 5, 0.5) | 1 |
| XeCl | 308 nm | Ne, Xe, HCl | (100, 1, 0.3) | 2 |
| XeF | 351 nm | He, Xe, $NF_3$ | (100, 1, 0.5) | 1 |
| HgI | 443 nm | Ne, $HgI_2$ | (100, 0.3) | 2 |
| HgBr | 503 nm | Ne, $HgBr_2$ | (100, 0.3) | 4 |
| HF | 2700 nm | $SF_6$, $H_2$, Xe | (80, 20, 2) | 0.2 |
| DF | 3000 to 4000 nm | $SF_6$, $D_2$, Xe | (80, 20, 2) | 0.2 |
| $CO_2$ | 9000 to 11000 nm | He, $N_2$, $CO_2$, Xe | (100, 25, 25, 2) | 1 |

In the example shown in FIG. 3, the ionization trigger device is formed inside the cathode 3. It comprises the electrode 8 for emitting electrons under the field effect, said electrode being disposed inside an evacuated chamber extending along the entire length of the cathode. The electrode is fed with a pulse that is negative relative to the cathode by means of the generator 7 which supplies a voltage lying between 50 kV and 100 kV and which has a rising slope which is made as steep as possible by means of a steepening device 6. The electrons create X-rays by colliding against the inside face of the cathode.

The X-rays serve to create electrons in uniform manner in the laser's active medium by ionizing the atoms which absorb the rays. In order to obtain as great an electron density as possible, it is necessary for the X-rays to be nearly completely absorbed by the active gas, and to this end X-ray absorbing atoms with high atomic number Z are present in the active gases in the table above. If it is desired to use a known active gas mixture which does not include heavy atoms, eg. a carbon dioxide ($CO_2$) based mixture emitting at 10 micrometers, it is necessary to add a small quantity of heavy gas such as xenon, for example, which will not interfere with laser operation, but which will nevertheless create electrons by ionization. That is the reason for xenon being present in the HF and DF laser mixtures. The xenon pressure depends on the size of the active medium, and is adjusted so as to obtain uniform X-ray absorption. Thus for a 1 cm gap between the anode and the cathode, the xenon pressure should be about 2 torrs, while for a 3 cm gap it should be about half a torr.

Figure 4:
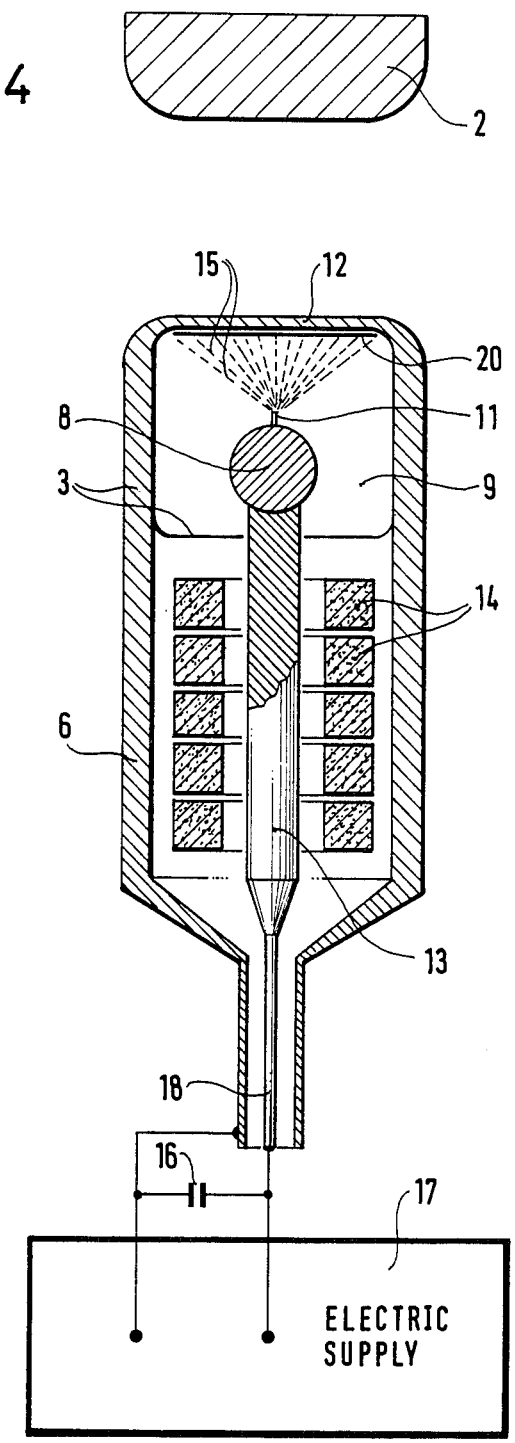
FIG. 4 is a cross section through the middle of the laser and in a plane perpendicular to its axis.

FIG. 4 is a section through the device 6 for steepening the negative rising edge of the pulse applied to the electrode 8, using a particular arrangement based on the principle of magnetic compression. The figure also shows details of the X-ray generator situated inside the laser cathode 3. The generator comprises the electrode 8 provided with a sharp edged blade 11 for emitting electrons at about 100 keV under the field effect in order to bombard a high atomic number metal such as tantalum (Z=73). The metal is disposed in the form of a sheet 20 which is thin enough to be capable of emitting X-rays towards the anode 2 through the laser medium. In order to obtain sufficient mechanical strength, the thin sheet is supported by a thicker sheet 12 made of low atomic number metal such as aluminum (Z=13), or beryllium (Z=4), which are transparent to X-rays at 50 keV. The electrode 8 with its thin blade 11 for obtaining electron emission by the field effect is disposed at sufficient distance from the inside face of the cathode to ensure that the emitted electron beam completely covers the cathode following trajectories 15. This distance is known to persons skilled in the art and depends on the inside geometry of the cathode. The thin blade 11 may be constituted, for example, by a 10 micron thick piece of tantalum, or by a carbon felt that is several millimieters thick, or by a stack of carbon fibers whose ends are pointed towards the cathode.

Inside the device 6, which is cylindrical in shape, there are magnetic pulse compressing components. The negative pulse of about 100 kV and of very short rise time (less than 10 ns) to be applied to the electrode 8 is obtained as follows. A capacitive component 16, referred to herein as the trigger capacitor is charged by pulses with a rise time of about 1 microsecond from a power supply unit 17 which may be constituted by a voltage-raising pulse transformer of known technology. This component, with a capacitance of about 0.1 to 1 microfarads for example, may be constituted by the connecting cable 18 itself. The connecting cable is connected to the electrode 8 by a conductor 13 surrounded by magnetic material 14 arranged in a sleeve inside the cylinder 6. In the example shown, the magnetic material 14 is in the form of rings of hard ferrite of the kind generally used at high frequencies. Other embodiments could equally well use sheets of amorphous magnetic metal better known under trade marks such as Deltamax, Orthonal, or Metglas. All these magnetic materials are known for high saturation speeds.

When the negative voltage applied to the electrode 13 begins to increase, the magnetic material is not saturated, so the entire voltage is applied across the high inductance created by the presence of the ferromagnetic material, and no voltage appears at the electrode 8. Then, as the voltage continues to increase, a small voltage appears at the electrode 8 which begins to emit low energy electrons (and therefore not capable of creating X-rays). The low current will thus begin to saturate the permeability of the ferromagnetic material, which has the consequence of greatly reducing the series inductance and hence of rapidly increasing the voltage on the electrode 8. This runaway phenomenon contributes to accelerating the appearance of the voltage on the electrode 8. The net result is that the front is made even steeper for X-rays of suitable energy (50 keV) for use in the laser medium on the other side of the cathode since the X-rays emitted at the beginning of electron emission are not energetic enough (20 keV) to pass through the cathode material.

This device thus performs its role of triggering the laser discharge by generating sudden ionization of the laser medium. Without going beyond the scope of the invention, other geometries could be imagined for the X-ray electrode, as could other systems for steepening the pulse's leading front.

At low operating rates, a spark gap could be connected in series in the conductor 13, for example, and the magnetic cores could be omitted.

Figure 5A:
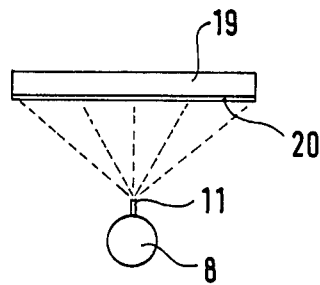
FIGS. 5A to 5D show constructional details of different types of cathode for use with different active laser media.
Figure 5B:
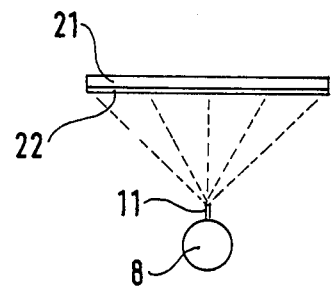
Figure 5C:
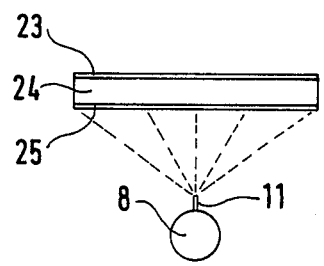
Figure 5D:
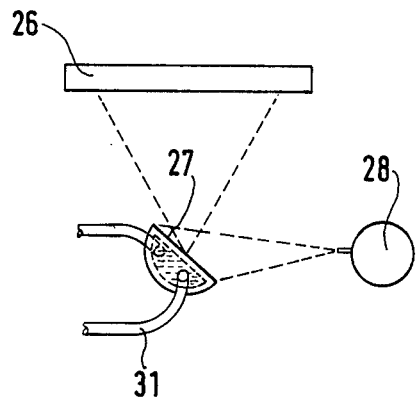

At high operating rates, the thin tantalum sheet for generating the X-rays heats up under the effect of repeated electron bombardment and a different geometry must be used in which the X-rays are generated on a solid target situated on the inside face of the cathode, as shown in FIG. 5D which is described below.

FIGS. 5A to 5D show detail variants of the structure for the X-ray emitting cathode.

In FIG. 5A, the composite cathode is constituted by a 10 micron thick sheet of tantalum 20 supported on a 2 mm thick beryllium plate 19.

FIG. 5B is very similar to FIG. 5A, but in this case the tantalum sheet 22 is only 8 microns thick and the support plate 21 is made of aluminum which is 1 mm thick.

FIG. 5C is of the same type as FIG. 5A having a 1.5 mm thick beryllium plate 24 and the same 10 micron thick tantalum sheet 25. A 10 micron thick sheet of stainless steel 23 has been added to the active medium side of the beryllium plate to protect the cathode from chemical attack by certain compounds such as bromine in the HgBr laser. Beryllium can likewise be protected against HCl attack by an electrolytic deposit of nickel for the XeCL laser.

FIG. 5D shows a preferred embodiment of the cathode for use at a high repetition rate. In this case, the thin sheet of tantalum is replaced by a solid tungsten target 27 disposed at 45° to the rigid wall of the cathode 26 which is facing the laser anode. This wall is made of a metal which is transparent to X-rays. The tungsten electrode is bombarded at 45° by electrons emitted by an electron canon 28 which is better collimated than is emission by the field effect from the electrode 8 in FIG. 3, and the general direction of emission is at 90° to the average direction of the X-rays going towards the cathode. The tungsten target 27 is cooled by internal water cooling by means of circuit 31.

The apparatus as a whole as described in the present specification together with its variants makes it possible to obtain reliable operation on an industrial scale for practically every kind of transversely excited gas laser. It also has the advantage of increasing the efficiency of said lasers and of obtaining high frequency operation.

Naturally the invention is not limited to the embodiment described and shown, which has merely been given by way or example. In particular, the following modifications may be advantageous:

The source of X-rays described herein as being inside the laser cathode, could be disposed in the anode if necessary, or to one side of the laser.

The list of mixtures of gases is not exhaustive, and implementation of the invention merely requires the addition of a gas of high atomic number to a gas mixture suitable for use in a gas laser, in the event that said mixture does not already contain any.

Finally, the rising front steepening device in the trigger whose function is essential for proper operation of the invention, may be implemented by any means suitable means other than by magnetic compression.

Lasers made in accordance with the invention may be used in any of the known applications of powerful, short (less than one microsecond) pulse lasers, such as machining, photochemistry, telemetry, illumination, etc.

I claim:

1. In a gas laser excited by a transverse electric discharge itself triggered by photoionization, said laser comprising:

two spaced linear laser electrodes, namely a laser cathode and a laser anode, extending parallel in a longitudinal direction and facing each other, means for maintaining the space between said electrodes occupied by an active gaseous medium suitable for amplifying laser radiation when excited by said electric discharge;

a laser capacitor having very low impedance enabling rapid discharge into said active medium to excite said medium, and having its two terminals directly connected to the two laser electrodes;

a high energy laser charging circuit for charging said laser capacitor to an operating voltage which is less than the self-discharge voltage which would on its own cause arcs to strike across between said laser electrodes, said charge creating an operating electric field in said active medium;

a generator of ionizing radiation for directing a pulse of trigger radiation into the active medium, after the active medium has been subjected to the operating field, said pulse being sufficiently large to trigger a uniform transverse discharge between the laser electrodes to make the medium a laser radiation amplifying medium;

said generator of radiation comprising a high-speed, short rise time voltage generator supplying said trigger pulse in less than 10 nanoseconds, and wherein said high energy laser charging circuit comprises means for supplying the voltage of the laser capacitor to said laser electrodes before the ionizing radiation generator directs the pulse of trigger radiation into said active medium, whereby, a homogeneous laser discharge is obtained between the electrodes with increased energy efficiency, increased operating rate, and extended lifetime for said gas laser.

2. A gas laser excited by a transverse electric discharge itself triggered by photoionization, said laser comprising:

two spaced linear laser electrodes, namely a laser cathode and a laser anode, extending parallel in a longitudinal direction and facing each other, means for maintaining the space between said electrodes occupied by an active gaseous medium suitable for amplifying laser radiation when excited by said electric discharge;

a laser capacitor having very low impedance enabling rapid discharge into said active medium to excite said medium, and having its two terminals directly connected to the two laser electrodes;

a high energy laser charging circuit for charging said laser capacitor to an operating voltage which is less than the self-discharge voltage which would on its own cause arcs to strike across between said laser electrodes, said charge creating an operating electric field in said active medium;

a generator of ionizing radiation for directing a pulse of trigger radiation to the active medium, after the active medium has been subjected to the operating field, said pulse being sufficiently large to trigger a uniform transverse discharge between the laser electrodes to make the medium a laser radiation amplifying medium; and wherein said generator of radiation is a high-speed, short rise time voltage generator supplying said trigger pulse in less than 10 nanoseconds;

and wherein said generator of ionizing radiation is an X-ray generator and is formed in the laser cathode, said generator comprising:

an evacuate chamber inside said cathode;

a wall delimiting said chamber on the anode side thereof and comprising a metal support plate which is transparent to X-rays and which is mechanically strong enough to withstand the pressure of said active medium, and the inside face of said wall bearing a thin sheet of X-ray generating metal;

an emissive electrode disposed inside said chamber opposite to said X-ray generating sheet and suitable for emitting a flux of electrons under the acceleration of an electric field;

and wherein said short rise time voltage generator comprises means for applying a high tension pulse to the emissive electrode which is negative relative to the active wall, whereby said generator sheet is bombarded by energetic electrons causing X-rays to be emitted by said sheet into the active medium through the support plate.

3. A laser according to claim 2, wherein said short rise time voltage generator comprises:

a trigger capacitor;

a low energy trigger charging circuit for slowly charging said capacitor;

a connection line connecting said capacitor to said electron emitting electrode;

and a ferromagnetic sleeve which is saturable at a high saturation speed in such a manner that when a negative voltage is applied by the trigger capacitor to the emissive electrode via the connection line, the speed of growth of the electron current intensity emitted by said electrode is initially highly limited by the inductance of said ferromagnetic sleeve, so that only a small fraction of the trigger capacitor voltage is applied to said emissive electrode, said speed of growth then becoming very high when said sleeve begins to saturate magnetically, with substantially the entire trigger capacitor voltage being applied to said emissive electrode.

4. A gas laser excited by a transverse electric discharge itself triggered by photoionization, said laser comprising:

two spaced linear laser electrodes, namely a laser cathode and a laser anode, extending parallel in a longitudinal direction and facing each other, means for maintaining the space between said electrodes occupied by an active gaseous medium suitable for amplifying laser radiation when excited by said electric discharge;

a laser capacitor having very low impedance enabling rapid discharge into said active medium to excite said medium, and having its two terminals directly connected to the two laser electrodes;

a high energy laser charging circuit for charging said laser capacitor to an operating voltage which is less than the self-discharge voltage which would on its own cause arcs to strike across between said laser electrodes, said charge creating an operating electric field in said active medium;

a generator of ionizing radiation for directing a pulse of trigger radiation to the active medium, after the active medium has been subjected to the operating field, said pulse being sufficiently large to trigger a uniform transverse discharge between the laser electrodes to make the medium a laser radiation amplifying medium; and wherein said generator of radiation is a high-speed, short rise time voltage generator supplying said trigger pulse in less than 10 nanoseconds;

said laser being suitable for operating at a high repetition rate, and wherein said generator of ionizing radiation is a generator of X-rays and is formed in said laser cathode, said generator comprising:

an evacuated chamber inside said cathode;

a rigid metal wall delimiting said chamber on the anode side, said wall being transparent to X-rays;

an electron emissive electrode;

a target disposed inside said chamber facing said wall in such a manner as to emit X-rays towards said rigid wall when it is itself bombarded by electrons from said emissive electrode;

a target cooling circuit;

and said short rise time voltage generator comprises means for applying a high tension pulse to said emissive electrode, said pulse being negative relative to the target, in order to bombard said target with energetic electrons and to emit X-rays towards said active medium through said rigid plate.

5. A laser according to claim 1, wherein said generator of radiation comprises means for supplying said trigger pulse in less than 3 nanoseconds.

* * * * *